C. BERGEN.
Grain Separator.
No. 29,352.
Patented July 31, 1860.
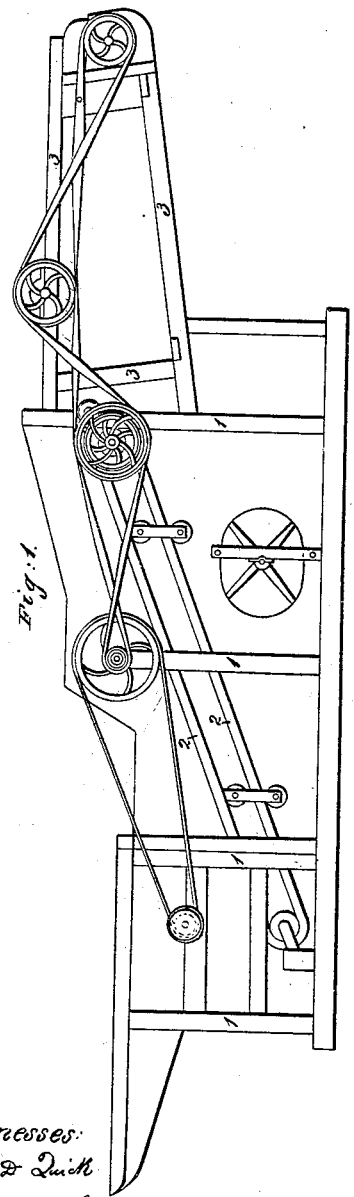
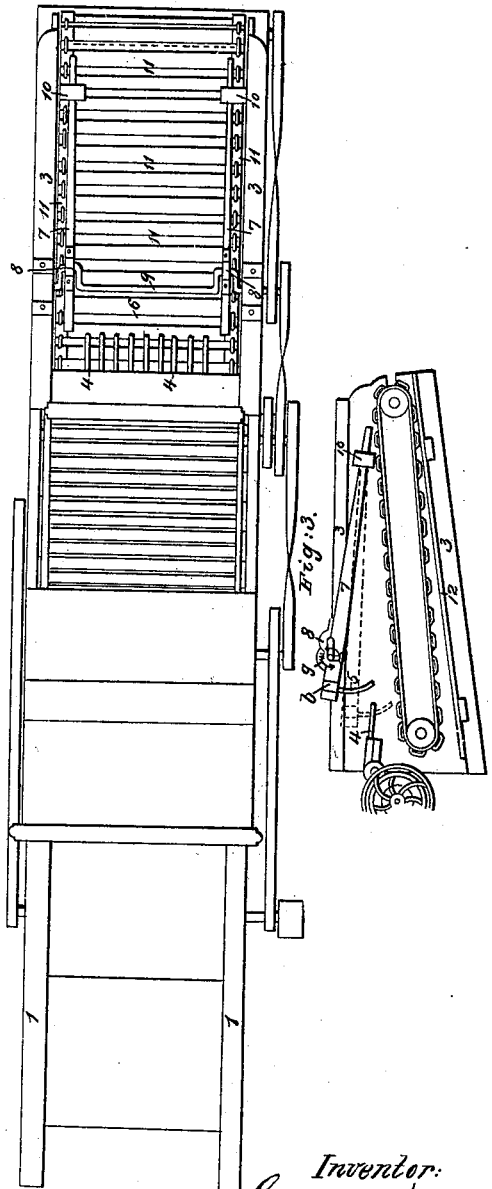
Witnesses:
Johns D Quick
Fayette Allen.
Inventor:
Cornelius Bergen.

UNITED STATES PATENT OFFICE.

CORNELIUS BERGEN, OF FARMER, NEW YORK.

GRAIN-SEPARATOR.

Specification of Letters Patent No. 29,352, dated July 31, 1860.

*To all whom it may concern:*

Be it known that I, CORNELIUS BERGEN, of Farmer, in the county of Seneca and State of New York, have invented a certain Improvement in Grain-Separators, the construction and operation of which I have described in the following specification and illustrated in its accompanying drawings with sufficient clearness to enable competent and skilful workmen in the arts to which it pertains or is most nearly allied to make and use my invention.

After the grain and straw passes from the threshing cylinder of a threshing machine, it is necessary they should be carefully separated from each other, and many devices have been contrived for that purpose, among which devices several arrangements of mechanism for pitching the straw forward and for loosening it up upon the carriers may be found. In my arrangement of parts for this purpose, the grain is first taken from the threshing cylinder by a common slatted belt, or carrier, from which it is delivered upon a set of stationary teeth placed above a rack made by attaching slats of wood to narrow belts, and from these teeth it is pitched by a rake which vibrates in a circle or nearly so, the arrangement and operation of the parts being such that while the teeth of the rake pass completely through the straw, and obtaining an excellent hold upon it, pitch it violently forward. The straw being held by the teeth and pitched violently forward therefrom, leaves a then unoccupied portion of the second carrier immediately below and forward of these through which the grain is permitted to descend without being retained upon the slats by the straw, which would otherwise be the case to some extent at least.

My invention is represented in the accompanying drawings as follows:—

Figure 1 is a side elevation of a threshing machine and carries with my improvement attached. Fig. 2 is a plan. Fig. 3 is a longitudinal vertical section of the parts which contain my improvement.

1, 1, is the frame of the machine.

2, 2, is the first carrier which receives the straw from the cylinder. There is nothing peculiar in the construction of these parts.

3, 3, is the frame which supports the parts in which my improvement is embodied. The straw as it is delivered from the first carrier, falls upon the teeth or fingers 4, 4, from which it is pitched forward by the rake teeth 5. These teeth are hung in the head or bar 6, which is framed at the ends to the side pieces 7, 7. These side pieces have bearing boxes attached to them, as indicated at 8, 8, in Fig. 2, to receive and cover the cranks of the shaft 9, by which motion is given to the rake.

10, 10, are vibrating bearings which receive the side pieces 7, 7, which are also allowed to slide in these bearings, thereby allowing the necessary revolution of the cranks to operate the rake. The shaft 9 revolves in the direction indicated by the arrows. It will be perceived that the rake has by this arrangement a greater vertical than longitudinal motion, and by this means a very excellent clearance of the rake teeth from the straw is secured. As the straw is pitched forward by the rake from the teeth 4, 4, it falls upon the carrier 11, by which it is carried forward and discharged. The arrangement of the fingers 4, in combination with the rake and with the carrier 11, is such as to leave unobstructed space under these fingers, the fingers 4 keeping the straw from lodging upon the carrier till it has been pitched forward by the rake beyond the ends of these fingers. This allows the grain to fall through between these fingers to the carrier 11, at a point where the straw can not entangle it, and where it will very naturally find its way down between the slats of the carrier to the inclined board 12 below, by which it is connected to the proper receptacle, and the agitation of the straw by the rake, in raking it from the fingers 4, very materially contributes to separate the grain from the straw, and allow it to pass down, as before stated.

The arrangement described for delivering the grain to the carrier 11, at a point back of the point at which the straw falls upon the same carrier, and for securing the perfect separation of the grain at that point by means of the combined operation of these parts is an important provision which is necessary to perfect success.

Having thus fully described my invention, I claim as the improvements which constitute it—

1. The combination of the fingers 4, 4, receiving the grain from the first carrier, the rake 5, 6, 7, and the carrier 11, substantially as and for the purpose set forth.

2. The arrangement of the rake 5, 6, 7, in connection with the vibrating bearings 8, 8, and crank shaft 9, in the order and manner described, that is to say, the crank shaft being placed between the rake head 6 and the vibrating bearings, by which a greater and more perfect agitation of the straw and clearance of the rake is secured, by means of the greater vertical than horizontal motion given to the rake.

CORNELIUS BERGEN.

Witnesses:
 JOHN V. D. QUICK,
 FAYETTE ALLEN.